United States Patent [19]
Bodor et al.

[11] Patent Number: 6,113,969
[45] Date of Patent: Sep. 5, 2000

[54] WATER CONTINUOUS DAIRY BASE PRODUCT AND PROCESS FOR PREPARING SUCH PRODUCT

[75] Inventors: Janos Bodor; Axel de With, both of Vlaardingen, Netherlands

[73] Assignee: Unilever Patent Holdings BV, Vlaardingen, Netherlands

[21] Appl. No.: 09/194,400
[22] PCT Filed: May 9, 1997
[86] PCT No.: PCT/EP97/02502
§ 371 Date: Feb. 3, 1999
§ 102(e) Date: Feb. 3, 1999
[87] PCT Pub. No.: WO97/46111
PCT Pub. Date: Dec. 11, 1997

[30] Foreign Application Priority Data

May 30, 1996 [EP] European Pat. Off. .............. 96201508

[51] Int. Cl.$^7$ ................................................... A23C 21/06
[52] U.S. Cl. ........................ 426/580; 426/519; 426/522; 426/583; 426/589
[58] Field of Search ................................. 426/589, 580, 426/583, 522, 519

[56] References Cited

U.S. PATENT DOCUMENTS 5,358,730 10/1994 Dame-Cahagne et al. ............. 426/580

FOREIGN PATENT DOCUMENTS 0390947 10/1990 European Pat. Off. .
83/00005 1/1983 WIPO .

*Primary Examiner*—Helen Pratt
*Attorney, Agent, or Firm*—Pillsbury Madison & Sutro LLP

[57] ABSTRACT

A water continuous, acidified dairy base product is provided having a dry matter content of 19–40% that contains 7–18% fat and 7–18% protein, the protein contains casein and whey protein and contains at least 50% casein, the protein that is undissolved being 80–100%, that has a pH of 5.9–6.5, a firmness as indicated by the Stevens value at 10° C. of at least 40 g and a particle size D3.2 as measured by laser diffraction of at most 15 micron. The product can be used for similar purposes as crème fraiche but it contains more protein and less fat and calories. A process for preparing the product is provided as well.

14 Claims, No Drawings

WATER CONTINUOUS DAIRY BASE PRODUCT AND PROCESS FOR PREPARING SUCH PRODUCT

This application is the national phase of international application PCT/EP97/02502 filed May 9, 1997 which designated the U.S.

The invention relates to a water continuous dairy base product and to a process for preparing such product.

In the past decades, large groups of the population have changed their eating habits. Consumption of products such as mayonnaise, dressings, ice cream, dips, fancy desserts, spreads and cheeses, etc has increased dramatically while consumption of many more conventional foods has reduced. In parallel, physical activity has generally become less. As a result of these developments the diet of many people is more rich in fat and calories than is desirable.

One product, for example, the use of which has strongly increased, is creme fraiche. It is used for preparing e.g. dressings, dips, spreads and desserts as well as many warm dishes e.g. sauces. Although it is very suitable for such purposes from a sensoric point of view, it typically contains about 35% fat, while its protein content is only about 3%. It is an objective of the present invention to provide a product that can be used for similar purposes but that has a more balanced nutritional composition, i.e. more protein, less fat and less calories.

Such a product should be such that it can easily be stirred into food preparations and that it is easily spoonable.

Ideally it should not have syneresis. It is furthermore desirable for the product to be as natural as possible, containing little or no additives such as emulsifiers or stabilizers. The presence of such additives would limit the scope of applications for legal reasons and also because many customers do not appreciate the presence of such additives. We found that these requirements are difficult to meet. Products similar to creme fraiche tend to have high fat and dry matter contents and thereby high caloric values. Products with lower fat contents, like low fat fresh cheese type products, we found, did not give sensorically satisfactory results, in particular with respect to the mouthfeel of the products. Also the taste of such products tended to be too pronounced, notably too sour.

U.S. Pat. No. 4,655,127 describes a continuous process for producing products like Ricotta or cottage cheese comprising e.g. 20–30% dry matter, 10–13% protein and 4–13% fat. An ultrafiltration retentate from milk and/or whey is heated to the coagulation temperature, depending on the type of cheese to be made. After the heating, coagulant is dosed in line, e.g. lactic acid, at a pressure of 0.5 to 2.5 bar above atmospheric pressure. The pH then normally is 5.5–6.1. The resulting composition is mixed by subjecting it to an abrupt pressure drop, to atmospheric pressure, by means of a back-pressure regulator. The acidification step is combined with the drop in pressure. This causes cheese grain formation to occur. After the pressure drop the product is partially cooled, preferably to 60–70° C. in about 20 seconds, packed, and cooled further. At the packing stage the product is a non-homogeneous mixture of liquid and grains.

U.S. Pat. No. 4,497,834 describes a process for preparing a processed cheese like dairy-based food product. Milk is condensed to the proportion of milk solids and water desired in the end product. The lactose content is reduced. Further fat may be added as well as other ingredients, e.g. acids e.g. to obtain a pH of 4.5–7.0, preferably 5.3–5.8. The mixture is gelled by heating but rennet may also be incorporated. Typically heating for 2–5 minutes at 80° C. (175° F.) is sufficient but longer heating may be applied. The product contains emulsifiers such as phosphates and/or citrates to prevent fat separation. To prevent moisture separation it is further desirable to include stabilizer, e.g. carrageenan, guar gum, etc. Subsequent to the heating, the product can be cooled and packed. Dairy food product thus prepared should be of semi-soft consistency that is capable of being sliced and retain its form. The moisture content of the product is typically 35–55% and the fat content 10–30%, but a wide variety of non-dairy materials may be incorporated in the product, e.g. honey, peanutbutter, bacon, vegetables etc. For cheese food dips the moisture content may be up to 60–65%.

U.S. Pat. No. 2,501,445 describes a spread e.g. for spreading on bread or crackers made from milk such that all nutrients of the milk, e.g. vitamins, minerals and especially the lactose, are contained in the spread. The product may contain 30–70% water. Butterfat is included in an amount between 0.5 and 1.75 times the weight of the non-fat dry contents. The product can be prepared by adding an appropriate amount of butterfat to whole milk and concentrating the mixture by vacuum evaporation to the desired dry matter content. To obtain the intended consistency it may be desirable to include waterbinding agent like gelatin, pectin etc. The mixture is pasteurized at about 65° C. (150° F.) to 87° C. (190° F.) for a period of 0.5–10 minutes, generally the length of the heating time being considerably reduced as the temperature is increased. The mixture is then homogenized and packed. At any stage of the process other ingredients may be incorporated, like acids, ketones, inorganic salts, cheese, vegetables, fruits, vitamins.

EP 340,857 also describes a spread on the basis of dairy material. It is prepared by mixing an aqueous phase and a fat phase such that the fat content is 5–45%, the aqueous phase contains 15–50% solids of which at least 30% are non-fat milk solids. The aqueous phase contains 8–20% milk derived protein 5–50% of which protein derives from whey protein concentrate. 1–4% melting salts calculated on the total composition is included. The composition is mixed, homogenized, pasteurized or sterilized and cooled.

EP 316,938 discloses the preparation of a milk concentrate. The concentrate consists of 8–12% fats, 9–11% milk protein, 1.5–1.7% lactose, 2.8–3.2% saccharose, about 2% minerals, about 0.5% salt and the balance of water. The milk concentrate is prepared by ultrafiltration of skim milk with 10% solids to obtain a product with about 20% solids. Appropriate amounts of fats, saccharose and salt are admixed and the composition is homogenized and heat-treated in a UHT-process. The concentrate has good keepability. It can be used to prepare a drink very similar to whole milk, without off-flavour, by diluting it 1:2 with water.

U.S. Pat. No. 5,064,660 describes ultra low-fat cheeses that are free from chemical emulsifiers and stabilizers but that have the texture, mouthfeel and flavour of conventional cheeses. They contain 8–30% protein, 2–10% fat and 50–70% moisture. As protein source, dairy protein derived from e.g. whole milk, ultra-filtered whole or skim milk, casein, alkali metal caseinates, cheese curd, cottage cheese etc. can be used. If cheese or cheese curd is used, its pH preferably is 6.0–6.5. The overall composition is preferably controlled such that the pH of the product is 5.5–5.7. The higher moisture products are used as spreads, the lower moisture products are formed into bricks or other shapes. The product is produced by forming a relatively dry mixture of the ingredients, then plasticizing the mixture by means of the high speed cutting action of a razor sharp bladed food comminuter or of ultrasonic treatment to rupture the fat globules and the protein matrix. The resulting fat and protein fragments are generally smaller than 10 micron. To create this structure, homogenization is inadequate for this purpose, it is a too gentle treatment. Subsequently the mixture is heattreated at 74–93° C. for 3–5 minutes.

EP 390,947 describes the preparation of a low fat butter or margarine product using a process similar to the one described in U.S. Pat. No. 5,064,660. This product contains 8–13% protein, 22–28% fat and 40–60% moisture. The relatively dry composition is plasticized by means of the high speed cutting action at a temperature of 2–38° C. and the resulting product is packed.

Although some of the products described above can have an attractive nutritional composition, none of them has the structural and organoleptic properties required for a creme fraiche alternative.

We have now found a product that meets the above objectives. Accordingly the invention provides a water continuous, acidified, dairy base product having a dry matter content of 19–40% that comprises 7–18% fat and 7–18% protein, the protein comprising casein and whey protein and consisting of at least 50% of casein, the portion of the protein that is undissolved being 80–100%, that has a pH of 5.9–6.5, a firmness as indicated by the Stevens value at 10° C. of at least 40 g and a particle size D3.2 as measured by laser diffraction of less than 15 micron.

The product has a very smooth creamy texture. Also in the mouth it gives a creamy impression. Its taste can be very neutral. The product is stable for a considerable period of time. It can easily be stirred, and if then left to stand, it is still stable and no syneresis or oil oxidation occurs. It is firm enough to not adversely affect the firmness of products in which it is incorporated and also to be suitable as such, e.g. as a spoonable product, for many applications with the possible inclusion of only minor amounts of taste and flavour imparting substances. To achieve this, there is no need to include emulsifiers or stabilisers. Furthermore, considerable amounts of aqueous or oily substance can be stirred into the product without de-stabilizing it. Because of this property, in some applications the conventionally used amount of emulsifier, e.g. egg yolk, can be reduced or such emulsifier can even be eliminated. We believe that to have these desirable properties, both the compositional parameters as well as the undissolved protein content, the firmness and the particle size are critical. The particle size reflects the condition of especially the fat and the protein in the product. The very fine structure also contributes to giving the product its firmness. The structure is of a versatile type that allows it to incorporate additional water or oil and to restore itself if it has been ruptured e.g. by stirring. We believe that this combination of a nutritionally attractive composition with the described structural and sensoric properties can only be realized at the specified pH range using acidification, preferably by an acidifying culture.

The invention also provides a process for preparing the water continuous dairy base product having a Stevens value at 10° C. of at least 40 g, an undissolved protein content of 80–100% calculated on the total amount of protein and a particle size D3,2 as measured by laser diffraction of at most 15 micron, comprising 1. preparing an acidified concentrated milk having a dry matter content of 19–40% that comprises 7–18% fat and 7–18% protein the protein comprising casein and whey protein and consisting of at least 50% of casein, that has a pH of 5.9–6.5,
2. subjecting the acidified concentrated milk to a heat treatment at a temperature T in ° C. of at least 80° C. for a period of at least t minutes with t=20/(T−78), preferably t=60/(T−78), and
3. homogenising the heat treated, acidified concentrated milk at a pressure of at least 80 bar.

We found that, once the product is produced, it is very robust. However, to prepare it, great care must be taken. As will be described below, if process conditions are not properly controlled, the desired properties may not be obtained. For example, the product may be too soft and thin, the particle size may become too large giving the product a grainy mouthfeel, the mouthfeel may become chalky or syneresis may occur.

Preferably the present product is prepared by the present process. Preferably the product does not contain non-dairy stabilizers e.g. hydrocolloids such as gelatin, locust bean gum, modified starches. Such ingredients are not only undesirable from a labelling point of view. If present in significant amounts, they may adversely affect the rheological and sensoric properties of the product. Similarly it is preferred for the product not to include non-dairy emulsifiers e.g. partial glycerides and soybean lecithin. Also the presence of emulsifying salts, e.g. sodium phosphates and -polyphosphates is not preferred for similar reasons. Emulsifying salts in significant amounts typically also raise the portion of the protein in the dissolved state. If the undissolved protein content becomes too low, the product looses its structure and becomes very soft.

By the expression "base product" is meant that the product is suitable for incorporation in food products or to serve as a basis in which other ingredients are included to provide the consumable end product. Although the base product can be eaten as such and has a pleasant creamy mouthfeel, consumers would usually find it not interesting because of its typically bland taste. The base product can however be turned easily into a consumable end product e.g. by combining it with e.g. fruits or jam or by incorporating e.g. a minor amount of cheese with a pronounced taste, e.g. Gorgonzola, in it.

By the expression dairy base product is meant that the base product is essentially produced from dairy materials. Notably the protein of the product preferably is essentially dairy protein, i.e. casein and whey protein. Also the fat of the product preferably is dairy fat. Overall at least 80%, preferably at least 90% of the product consists of material of dairy milk origin, preferably cow's milk origin. Most preferably the product consists of matter of dairy milk origin with the exception of material to obtain the required pH and the optional presence of cooking salt.

To have the desired properties the base product must have a continuous aqueous phase. Whether the product has a continuous aqueous phase can conveniently be assessed by means of microscopic investigation or electrical conductivity measurement.

The firmness of the product can conveniently be characterised by the Stevens value at T° C. expressed in grams. The measurement is carried out with a Stevens LFRA Texture Analyzer (ex Stevens Advanced Weighing Systems, Dunmore, UK), using a cylindrical probe with a diameter of 12.7 mm, using a loadcell of 1000 g, operated "normal", penetration depth 10 mm, penetration rate 2.0 mm/s. Before measurement, samples are conditioned for 3 days at 5° C. and then 24 hours at the measuring temperature.

The Stevens value at 10° C. should be at least 40 g, preferably it is 50–250 g, more preferably 70–150 g. By the particle size D3,2 of the product is meant the surface weighted mean diameter of the particle distribution as measured by laser diffraction; preferably wide angle laser diffraction, using a suspension cel with demineralized water (See e.g. ZFL 8/88, pages 665–669). This measurement is suitably carried out with Helos 12 LA equipment ex Sympatec GmbH, Germany, having a helium/neon laser, $\lambda=632.8$ nm operating according to the instruction manual. While preparing the equipment and measuring the baseline using just demi-water in the suspension cell, the sample is prepared by dispersing 2 g of product in 20 ml demineralized water at ambient temperature using a magnetic stirrer for about 5 minutes. To start the measurement, sample is pipetted into the water of the suspension cell until an optical concentration appropriate for the measurement is obtained, as indicated by the equipment. After the measurement is successfully completed, the equipment calculates amongst other things the particle size $D3,2$. After the measurement is completed, ultrasone treatment is applied for 2 minutes and the measurement is repeated. The "ultrasone treated particle size" ($D3,2u$) is then calculated as well.

The $D3,2u$ value of the present product is typically somewhat, but not much, smaller than the $D3,2$ value.

The particle size $D3,2$ of the product should not exceed 15 micron, preferably it is 0.1–10 micron, more preferably 0.5–8 micron, especially 1–7 micron. $D3,2u$ preferably is 0.1–8 micron, more preferably 0.5–6 micron, especially 1–4 micron.

The pH of the product should be 5.9–6.5, preferably 6.0–6.4, more preferably 6.2–6.4.

At least 50% of the protein of the product should be casein. Whey protein must be present, but a very small amount can be sufficient. Preferably the protein of the product comprises 60–956 casein and 5–40% whey protein, more preferably it comprises 70–90% casein and 10–30% whey protein. The protein content of the product preferably is 8–16%, especially 9–14%.

We found that especially pH, particle size and firmness are interrelated. At too high pH, the product tends to loose its firmness. At too low pH the product often has too big particle size and a too low firmness. Furthermore, outside the prescribed pH range we often find the product to suffer from syneresis or chalkiness and often from both. Chalkiness is a product defect for which we do not know an objective test. It is experienced as a rough feeling in the mouth, it is different from sandiness or graininess which is caused by a too big particle size. In conventional products, chalkiness can frequently be found e.g. in low fat quark.

It is preferable for 90–100% of the protein of the product to be present in the undissolved state. The amount of dissolved protein in the product is suitably determined as follows:

Dilute the product 1:1 with distilled water

Homogenise the sample and keep it at 45° C. for 10 minutes

Centrifuge at 5° C. for 15 minutes at 9000 rpm.

After centrifuging, the dissolved protein is present in the aqueous intermediate layer in the centrifuge tubes. The protein content of this layer is analyzed in conventional manner. The dissolved protein content of the product is given by $(M+100)\times P/100\%$ wherein M indicates the moisture content(%) of the product and P indicates the protein content (%) of the intermediate layer. The difference between the total protein content and the dissolved protein content of the product is the undissolved protein content of the product. This can then suitably be expressed as a percentage of the total amount of protein present in the product.

The fat content of the product preferably is 9–16% especially 11–15%. The product preferably has a dry matter content of 23–37%, especially 26–35%. The lactose content of the product preferably is less than 8%, especially less than 6%. It is particularly preferred for the product to be prepared from sweet milk ultrafiltration retentate. Although we do not wish to be bound by theory, we believe that the compositional properties of sweet milk ultrafiltration retentate, notably its balance of proteins, lactose and minor constituents like calcium contribute to obtaining excellent product properties. As such for example a UF retentate prepared from whole or standardized milk can be used. Also a combination of UF retentate from skimmilk combined with cream can be employed.

Throughout this specification, all parts, portions and percentages are by weight. The expressions comprising and comprises encompass consisting of and consists of, except where indicated otherwise.

Particularly good products are obtained with the present process. In the present process first an acidified concentrated milk is prepared that in essence has the protein, fat and dry matter contents and the pH, as desired for the end product. Preferably first the concentrated milk is produced and then the pH of the concentrated milk is caused to reduce to a pH of 5.9–6.5, preferably 6.0–6.4, especially 6.2–6.4. In principle other approaches can be used. For example, a cream may be acidified to a lower pH and then be combined with concentrated skimmilk such that the desired pH, fat, protein and dry matter contents are obtained, but we found that such an approach is less reproducible. The risk is considerable that satisfactory product is not obtained, notably the particle size may be too big and/or the product may show syneresis.

Preferably the concentrated milk is prepared using at least as source of the major part of the protein, UF retentate For example as concentrated milk UF retentate of whole or standardized milk can be used. Also a mixture of skimmilk UF retentate and cream can be employed. Instead of or in addition to cream, butter or butter-fat and possibly vegetable fat can be incorporated. In such case, to prepare the concentrated milk, the composition is preferably homogenized prior to acidification. The retentate is preferably prepared from a sweet milk or skimmilk, meaning that the pH of the milk that is subjected to UF has not been changed substantially from that of the starting milk. Other approaches to prepare the concentrated milk can be used as well. For example skimmilk UF retentate may be combined with cream, skimmilk, sweet whey and/or whey UF retentate etc. Preferably, in preparing the concentrated milk the use of protein sources that have been substantially denatured by prior treatment is avoided. Suitable concentrated milk, or other dairy starting materials for preparing the concentrated milk are readily available from dairy companies. The concentrated milk can be acidified to the desired pH in any convenient manner, e.g. using lactic acid or glucono delta lactone. If so desired, milk can also be acidified to the desired pH and then be concentrated. For example, milk can be acidified e.g. to pH of 6.3 and then be concentrated by means of ultrafiltration. Preferably however first a concentrated milk with the desired fat, protein and lactose contents is prepared which is then acidified. Preferably the milk, before or after concentration, is acidified using a culture of lactic acid bacteria. As such, for example a starter culture commonly used e.g. in cheese or yoghurt making can be employed. Care should be taken that the pH does not become too low. If upon reaching the target pH of the concentrated milk when using a starter culture, one cannot immediate proceed to step 2 of the process, the culture should be inactivated. For this a short heat treatment at 60° C. is usually sufficient. If so desired, the acidified concentrated milk can then be kept at low temperature, e.g. about 4° C. for some time before proceeding with step 2 of the process.

Occasionally, the pH of milk can already be as low as 6.5. We found that also in these cases some acidification should be applied, else the resulting product is not good, notably it may not have the required firmness. Without acidification it may also prove difficult to obtain a sufficiently high portion of the protein in the undissolved state without applying excessive process conditions.

We do not wish to be bound by theory but we believe that the combination of acidification and subsequent heat treatment causes the whey proteins to denature and attach themselves to the surface of the casein micelles. Thereby the casein also appears to have become insoluble, and thereby contributes to the undissolved protein content. But we believe that the treatment does not cause significant denaturation of the casein itself. If however, the acidification were omitted, we believe, the whey proteins would still be denatured by the heat treatment but without attaching themselves to the casein. Thus, the dissolved protein content remains too high, the protein structure is different and subsequent homogenisation does not result in the desired product.

In step 2 of the process, the acidified concentrated milk is subjected to a heat treatment at a temperature of at least 80° C. The heat treatment should be applied for at least t minutes with $t=20/(T-78)$, preferably $t=60/(T-78)$ wherein T indicates the temperature of the heat treatment in ° C. For example, at 80° C. the heat treatment should be applied for at least 10 minutes, preferably at least 30 minutes. At 95° C., 5 minutes is more than necessary. If heating up is carried out relatively slowly, the time during heating up while the temperature is above 80° C. should be taken into account when calculating the minimum holding time. Preferably the heat treatment is carried out at 83–99° C., more preferably 86–95° C. Higher temperatures, e.g. in an UHT treatment can also be applied; then preferably a pH of the product on the higher side of the range is used, e.g. about pH 6.4. If the temperature at which the heat treatment is carried out is too low, the desired firmness is not obtained, even if the treatment is applied for an extended period of time. Excessively high temperatures, or large differences in temperature within the product are preferably avoided as well. We found for example that heating up in a microwave oven may result in unsuitable product. Heating can conveniently be done in conventional manner e.g. continuously using a plate or tubular heat exchanger or batchwise using e.g. a Stephan cutter®.

Especially preferably the heat treatment is applied for a period of at least t minutes with $t=100/(T-78)$. Although the process is not very sensitive to prolonged duration of the heat treatment, excessively long heat treatment is preferably avoided for economical reasons and also because it may have an adverse influence on the resulting product. Preferably the duration of the heat treatment is not longer than t' minutes with $t'=700/(T-78)$ wherein again T indicates the temperature in ° C.

Subsequently the heat treated acidified concentrated milk is subjected to homogenisation at a pressure of at least 80 bar. We found that the homogenisation is essential to obtain the desired product properties. The homogenisation can be carried out using a conventional homogenizer as commonly employed in the dairy industry. The homogenisation can be carried out while the composition is still hot from the heat treatment. This is convenient because then the roduct can be packed while it is still warm enough to effectively eliminate the risk of microbiological contamination. However, also in view of the resulting product structure we found it beneficial to carry out the homogenisation at elevated temperature, e.g. at a temperature of at least 60° C. Preferably homogenisation is done at 65–99° C., more preferably at 70–93° C. The pressure applied for the homogenisation is preferably 100–900 bar, more preferably 125–600 bar, especially 150–300 bar.

The sequence in which the process steps are applied is important. If for example first the concentrated milk is heat treated and then acidified, the resulting product tends to suffer from syneresis, usually does not have a good mouthfeel and often has a too big particle size. Similarly, if the product is first homogenized and then heat treated optimal products are not normally obtained. Also a sequence of homogenisation, acidification, heat treatment does not give the desired result; the product can be very chalky. If, subsequent to the heat treatment another homogenisation is applied however, the resulting product can be good. Therefore, the homogenisation of the concentrated milk before the acidification is not detrimental, but cannot replace the homogenisation after the heat treatment. Also if one of the 3 steps of acidification, heat treatment and homogenisation is omitted, the resulting products are inferior.

With respect to the resulting product properties, within the limits indicated above, the process conditions applied and the compositions employed are to a degree complementary. For example, if a relatively short heat treatment is applied, the resulting product may have a relatively low Stevens value at 10° C. If a higher Stevens value is desired this can be achieved by prolonging the heat treatment or carrying it out at a higher temperature, or by applying a higher homogenisation pressure or by using a higher fat content in the product.

Although product according to the invention can be prepared in different ways, we found that the present process, particularly in its preferred embodiments described above, provides excellent base products which are very robust, easy to handle in preparation of consumable endproducts and which can make a very favourable contribution to the nutritional and sensoric properties of such endproducts. They do not suffer from syneresis, not even after they have been stirred, and can incorporate in them substantial amounts of moisture or oil should that be desirable, without loosing their structural integrity. They have a very smooth pleasant creamy mouthfeel and can have a very bland taste.

We do not wish to be bound by theory but we believe that in the present process, especially in its preferred embodiment, a unique structure is developed depending on the changes in and interactions between whey protein and casein components caused by the heat treatment influenced by the way in which the calcium is present as a result of the choice of raw material and pH, together with the presence of fat in amounts roughly comparable to that of protein, and the reduction of the fat global size by homogenisation after the changes in the proteins have been caused to occur by the acidification and heat treatment. Thus, protein attaches itself to the surface of the newly formed fat globules in a different manner than would occur if the homogenisation were done earlier in the process. Also, the relatively small difference in size between the fat globules and the remnants of the casein micelles we believe to be a relevant factor in obtaining the very good products obtainable by the present process, especially by the preferred embodiments thereof.

If so desired cooking salt, e.g. 0.1–3% may be included in the base product. In the present process it can be incorporated at any stage prior to the homogenisation.

The base product can be consumed as such, although its taste can be very bland. However a more tasty product can easily be obtained, by incorporating therein taste and flavour imparting substances. If the amount of taste and flavour imparting substances to be incorporated is small, e.g. when using cheese flavour, aspartame, strong tasting cheese like parmesan or gorgonzola, such small amounts can be incorporated e.g. during the present process without substantially affecting the pleasant structure of the product. For example such material can be incorporated before of after acidifying the concentrated milk. Preferably it is incorporated after applying the heat treatment, before the homogenisation. Alternatively such taste and flavour imparting materials can be stirred into the base product after homogenisation. Alternatively, e.g. very pleasant dessert can be prepared by mixing some powder sugar into the base product and serving it with fresh fruit, the base product with or without added material like sugar, can be applied as a layer in cakes, etc. Further possible applications include using the base product as an ingredient in preparing manufactured food products like icecream, dressings, spreads, desserts etc. When incorporating the base product in such food products, it contributes to giving the product a rich creamy texture and mouthfeel. As a result, the amount of fat and calories that would otherwise be required to obtain a similarly rich, creamy product, can be reduced. As a further example of possible applications, the dairy base product can be used as an ingredient in making cheese and cheese-like products, e.g. reduced fat soft cheese of the Camembert type. In such applications also, the product can contribute to obtaining better texture and moutfeel. Because of the bland taste of the base product, it does not impart an a-typical taste to the end product. This is an important benefit of the base roduct. A major problem with alternative approaches to lowering fat content in food products while maintaining a creamy mouthfeel is that often the resulting product has an a-typical taste or even an off-taste. With the present base product such problems need not occur. Thus the present base product allows preparing a wide range of food products, notably icecream, desserts, cheese products, dressings and spreads, having a rich creamy texture and mouthfeel, a natural taste not adversely influenced by the base product and a more favourable nutritional composition compared with the reference product prepared without the base product. Accordingly the invention encompasses food products comprising 1–99.9%, preferably 5–99% of the present dairy base product, the balance consisting of edible matter.

EXAMPLES 1–4

A concentrated milk was prepared by blending using an Ultra-Turrax:

52.5% skimmilk UF retentate (19% protein, 26% dry matter)
14.4% skimmilk (4% protein, 9.6% dry matter)
32.8% dairy cream (40% fat, 45% dry matter)
0.2% cooking salt Except for comparative example C3 the concentrated milk was inoculated with a starter culture at 24° C. When the pH reached the target value as indicated below, the acidified concentrated milk was heated for 2 minutes at 60° C. to inactivate the culture in case intermediate storage was applied or immediately subjected to the heat treatment. For example C3, the concentrated milk was not acidified. The heat treatment was carried out in a Stephan cutter operated at 1200 rpm. When the temperature reached 90° C., the product was kept at his temperature for 30 minutes. Subsequently the hot composition was passed through a Rannie® homogenizer ex APV, Houten Netherlands operating at 300 bar. The product was filled in tubs at a temperature above 70° C. and stored at 50° C.

The resulting products contained 13.1% fat and 11.2% protein consisting of casein and whey protein in approximately a 4:1 ratio. The dry matter content was 29.9%. The calcium content was 0.45%. Apart from the added 0.2% salt, the product contained 4.3% other dry matter which consisted mainly of lactose. The pH values applied and the Stevens values at 10° C. of the products were:

| Example: | C1 | C2 | E1 | E2 | E3 | E4 | C3 |
|---|---|---|---|---|---|---|---|
| pH | 5.45 | 5.6 | 5.9 | 6.1 | 6.3 | 6.45 | 6.6 |
| St 10 (g) | 10 | 10 | 80 | 185 | 160 | 170 | 20 |

Examples indicated by Cx are comparative examples. Examples indicated by Ey are examples according to the invention. Examples E1–E4 and C3 had small particles. The mouthfeel of the products was smooth and creamy. The products of C1 and C2 were very coarse and rough in the mouth.

After 3 days storage the samples C1–C3 showed serious syneresis. In examples E1–E4 no syneresis was observed. Samples E1–E4 were stirred with a spoon and then stored again. After 3 days still no syneresis was seen.

The amount of undissolved protein as % of the total amount of protein in the product for examples C1–C2 and E1–E4 was 90% or more, that for example C3 was only about 22%.

As is illustrated by the Stevens values, the products C1–C3 were too soft, while those of E1–E4, especially E2–E4 were much more firm.

EXAMPLES 5–7

Example E2 was repeated except that different homogenisation pressures were applied. All products were acceptable but they differed in firmness:

| Example | E5 | E2 | E6 | E7 |
|---|---|---|---|---|
| Pressure (bar) | 150 | 300 | 600 | 900 |
| St 10 (g) | 130 | 185 | 220 | 165 |

Whereas initially pressure increase leads to a more firm product, very high homogenisation pressure reduces the firmness again.

EXAMPLES 8–10

Example E3 was repeated except that after the heat treatment the composition was cooled before homogenisation. The resulting products were acceptable but they differed in firmness:

| Example | E8 | E9 | E10 |
|---|---|---|---|
| Homogenisation temperature (° C.) | 40 | 60 | 75 |
| St 10 (g) | 85 | 95 | 150 |

Especially at a homogenisation temperature above 60° C., more firm product is obtained.

EXAMPLE 11

Example E2 was repeated several times except that first 2.3 parts of cream were mixed with 1 part of skimmilk. The resulting cream was acidified to a pH of about 4.6. Then 47.2 parts of the acidified cream were mixed with 52.5 parts of the skimmilk UF retentate. The pH of the mixture was about 6.0. Often acceptable product was obtained but from time to time the particle size was too big, the product felt rough and/or coarse in the mouth and/or syneresis occurred. Also in some cases, products that initially did not show syneresis, showed syneresis after they had been stirred.

This reproducibility problem could not be solved by applying an extra homogenisation or by passing the composition through a colloid mill before the heat treatment. A further disadvantage of this process is that the acidification takes much more time.

COMPARATIVE EXAMPLE 4

Example E3 was repeated except that the concentrated milk was first heat treated and only thereafter acidified to pH 6.3. When this pH was reached the product was heated to 60° C. to inactivate the culture, and homogenized.

The resulting product was smooth but much too soft. Its St10 value was about 15. It showed severe syneresis. This example illustrates that without the heat treatment after the acidification, the right product is not obtained.

EXAMPLE 12

The procedure of examples E1–E4 was repeated except that:

the pH was 6.5 the homogenisation was done at 200 bar.

the acidified concentrated milk was heated up to 90° C. in a tubular heat exchanger and then kept at that temperature in the Stephan® cutter for 0, 20, 30 or 60 minutes. The residence time in the heat exchanger at a temperature between 80 and 90° C. was about 5 minutes.

The resulting products were acceptable but soft. Their St 10 values were between 45 and 70 g.

EXAMPLES 13–16

Example E12 was repeated except that the temperature to which the composition was heated, was varied. The compositions were kept in the Stephan® cutter at the indicated temperature for 10 minutes. The pH of the products was 6.3

| Example | C5 | E13 | E14 | E15 | E16 |
| --- | --- | --- | --- | --- | --- |
| Temperature (° C.) | 75 | 80 | 85 | 90 | 95 |
| St 10 | <10 | 42 | 80 | 85 | 115 |

All products were smooth and had particle sizes in the range of 1–10 micron. Syneresis did not occur. However, product C5 was too soft.

Example E16 was also carried out using a homogenisation pressure of 150 bar. In that case the product was sensorically indistinguishable from examples E14 and E15.

Example C5 was also done applying a heat holding time at 75° C. of 60 minutes. Still the product was too soft (St10=25).

EXAMPLES 17–18

To illustrate the importance of the fat content a series of trials was done as described in Example E12 except that the pH was 6.3–6.4 the heat holding time was 0 or 20 minutes the homogenisation pressure was varied at 200, 400 and 600 bar.

the concentrated milk was prepared using amounts as shown in Table 1. The compositional parameters are also shown in Table 1. All experiments were done twice.

TABLE 1

| Example | C6 | E17 | E18 | C7 |
| --- | --- | --- | --- | --- |
| Composition (%) | | | | |
| skimmilk UF | 52.5 | 52.5 | 52.5 | 52.5 |
| skimmilk | 30.8 | 22.6 | 14.4 | — |
| cream | 16.4 | 24.6 | 32.8 | 47.3 |
| salt | 0.2 | 0.2 | 0.2 | 0.2 |
| Contents (%) | | | | |
| Dry matter | 24 | 27 | 30.1 | 35 |
| protein | 11.6 | 11.4 | 11.2 | 10.9 |
| fat | 6.6 | 9.8 | 13.1 | 18.9 |

Syneresis was not observed in any of the products. Products from compositions E17 and E18 were acceptable at all process conditions applied.

The samples from composition C7 had an unacceptable, coarse mouthfeel. For the homogenisation pressures of 400 and 600 bar, the products were more firm than optimal (St10: 300–400 g).

The samples from composition C6 had small particle size, yet their texture was not smooth and homogeneous. Most of the samples were too soft (St10: 10–35). Only when applying 20 minutes heat holding and homogenisation pressures of 400 and 600 bar could St 10 values above 40 g be achieved. Yet the products were still not smooth and they were softer than desired. Increasing the homogenisation pressure up to 800 a 900 bar could not correct the deficiencies. To the contrary at these pressures the product lost its attractive shiny appearance.

Whereas in the products of E17, E18 and C7 the amount of undissolved protein was at least 90% of the protein of the product and in most cases 95–99%, it was lower for the products of C6. If no heat holding time was applied the amount of undissolved protein was only about 60%. With 20 minutes heat holding time and 200 bar homogenisation pressure, this was 80%, which increased to 91% in the product for which the homogenisation pressure had been increased to 400 bar.

EXAMPLES 19–22

Products were prepared as described in examples E1–E4, except that the duration of the heat treatment at 90° C. was 20 minutes and that the homogenisation pressure was 250 bar.

The pH values applied, the resulting stevens values at 10° C. and the D3,2 and D3,2u particle sizes were:

| Example | C8 | C9 | E19 | E20 | E21 | E22 | C10 |
| --- | --- | --- | --- | --- | --- | --- | --- |
| pH | 5.6 | 5.8 | 6.0 | 6.2 | 6.3 | 6.45 | 6.7 |
| St 10 (g) | 8 | 55 | 57 | 67 | 111 | 72 | 8 |

-continued

| Example | C8 | C9 | E19 | E20 | E21 | E22 | C10 |
|---|---|---|---|---|---|---|---|
| D3,2 (Micron) | 2.7 | 4.3 | 6.7 | 6.4 | 8.2 | 2.4 | 1.1 |
| D3,2u (Micron) | 2.4 | 3.4 | 4.6 | 4.4 | 4.1 | 1.0 | 0.8 |

Samples E19–E22 were all good, samples E20 and E21 being the best. Samples C8 and C10 were much too soft, while samples C8 and C9 were very chalky.

EXAMPLE 23

A low fat, creamy, honey-based product was prepared with the dairy base product using the following recipe:

55.0% dairy base product of example E21
15.5% butter
17.0% water
7.5% honey
4.6% sugar
0.3% carboxy methyl cellulose
0.1% locust bean gum.

The ingredients were mixed together and the composition was heated to 85° C. and kept at this temperature for 10 minutes. It was then passed through a homogenizer operating at 200 bar. The product was filled into tubs, cooled down to below 10° C. and then stored at 5° C. for 1 week.

Although the resulting product had a fat content of only 20%, it had a smooth, creamy mouthfeel and a pleasant honey taste. It was very suitable for spreading on bread but it could e.g. also be eaten as a dessert or be used as a creamy layer in cake.

EXAMPLE 24

The dairy base product of example 21 was used to prepare a mayonnaise—like product without egg and with a reduced fat content.

The overall composition was (parts by weight):

| | |
|---|---|
| 13.5 | dairy base product of E21 |
| 7.2 | vinegar (10%) |
| 1.4 | Sugar |
| 62.8 | vegetable oil |
| 0.2 | xanthan gum |
| 0.4 | cooking salt |
| 0.01 | pepper |
| 1.4 | mustard |
| 12.9 | water |

The dairy base product was mixed with the mustard and water. Then the salt, pepper, xanthan gum and sugar were added. Subsequently a major part of the oil was added slowly while mixing by hand. The vinegar was added while mixing continued and finally the remainder of the oil was added slowly while mixing.

The resulting product was organoleptically quite similar to conventional mayonnaise.

EXAMPLE 25

Dairy base product was prepared as described in example E20 except that before the homogenisation per 742 parts of the product 46 parts of sugar and 62 parts of honey were added. After the homogenisation the product was cooled down and stored for 1 day at 5° C. Then per 850 parts of the composition obtained 50 parts sweet apricot, 50 parts sour apricot and 50 parts water were stirred in. A very pleasant dessert with a creamy mouthfeel was obtained. The product could also be used for other purposes, e.g. for spreading on bread, for decorating cakes etc.

EXAMPLE 26

A Gorgonzola based sauce for use on pasta was prepare with the dairy base product using the following recipe:

30.0% dairy base product of example E20
0.4% whey protein concentrate (80%)
4.2% skimmilk powder
6.0% Gorgonzola cheese
3.0% other blue cheese
5.0% butter
0.2% carboxymethyl cellulose
0.2% xanthan gum
1.4% cooking salt
0.25% β-carotene solution (10%)
49.35% water All ingredients were stirred into the dairy base product, the composition was heated to 70° C. while stirring and then briefly mixed at that temperature in a Hobart® mixer. The composition was homogenised at 200 bar, packed and cooled down.

The resulting fluid sauce had a very smooth texture and adhered well to food. It could for example be used as a sauce for spaghetti.

EXAMPLE 27

The dairy base product of example E3 was used to prepare an ice-cream product. The overall composition was (parts by weight):

| | |
|---|---|
| butter: | 5.11 |
| Hymono 8903: | 0.31 |
| CMC: | 0.21 |
| Dairy base product*: | 36.64 |
| Water: | 36.39 |
| Sugar: | 16.47 |
| Lactose: | 4.59 |

*composition as prepared in example E3, except that the heat treatment in the Stephan ® cutter was at 90° C. for 20 minutes. The composition was homogenised at 100 bar.

The dairy base product, water, lactose and sugar were mixed in a Stephan® cutter at ~1200 rpm and heated to 40° C. At this temperature CMC was added and the mixture was stirred for another 5 minutes to obtain composition A. Hymono 8903 was added to the butter (80% fat) under stirring at 75° C. to obtain composition B. In a Hobart® mixer composition B was added to composition A under stirring at position 3. Subsequently the resulting mixture was homogenized at 50 bar, and stored at 5° C. A deep frozen bowl and a Philips household ice-making apparatus were then used to convert the mixture into an ice-cream composition.

The resulting product was smooth and creamy and had a good mouthfeel.

EXAMPLE 28

The dairy base product of example 21 was used to prepare a cake.

The ingredients were:

| | |
|---|---|
| Sugar | 200 g |
| Dairy base product (ex 21) | 225 g |
| Flour | 210 g |
| Water | 50 g |
| Sunflower oil | 75 g |

Sugar was mixed with the sunflower oil and this mixture was beaten vigorously for two minutes. The dairy base product was added and the resulting mixture was beaten vigorously for another four minutes. Then flour was added, followed by beating vigorously for one minute.

The resulting mixture was transferred to baking cups and baked at 170° C. for 20 minutes.

A good quality cake was obtained.

What is claimed is:

1. A water continuous, acidified dairy base product having a dry matter content of 19–40% that comprises 7–18% fat and 7–18% protein, the protein comprising casein and whey protein and consisting of at least 50% of casein, the portion of the protein that is undissolved being 80–100%, said product being further characterized by having a pH of 5.9–6.5, a firmness as indicated by a Stevens value at 10° C. of at least 40 g and a particle size D3.2 as measured by laser diffraction of at most 15 micron.

2. A product according to claim 1 having a particle size D3.2 of 0.1–10 micron.

3. A product according to claim 1 or claim 2 having a Stevens value at 10° C. of 50–250 g.

4. A product according to claim 1 having a dry matter content of 23–37%.

5. A product according to claim 1 wherein the portion of the protein that is undissolved is 90–100%.

6. A product according to claim 1 containing less than 6% lactose.

7. A product according to claim 1 prepared from sweet milk ultra filtration retentate.

8. A process for preparing a water continuous dairy base product comprising the composition claim 1 having a Stevens value at 10° C. of at least 40 g, an undissolved protein content of 80–100% calculated on the total amount of protein and a particle size D3.2 as measured by laser diffraction of at most 15 micron comprising 1. preparing an acidified concentrated milk having a dry matter content of 19–40% that comprises 7–18% fat and 7–18% protein, the protein comprising casein and whey protein and consisting of at least 50% of casein, said milk having a pH of 5.9–6.5,
2. subjecting the acidified concentrated milk to a heat treatment at a temperature T in ° C. of at least 80° C. for a period of at least t minutes with $t=20/(T-78)$, and
3. homogenising the heat treated, acidified concentrated milk at a pressure of at least 80 bar.

9. A process according to claim 8 wherein the heat treatment is applied for a period of at least t minutes with $t=100/(T-78)$.

10. A product according to claim 9 wherein the heat is applied for a period of at most t' minutes with $t'=700/(T-78)$.

11. A process according to claim 8 wherein the pH is obtained with the use of a culture of lactic acid bacteria.

12. A food product comprising 1–99.9%, of a dairy base product according to claim 1, the balance consisting of edible matter.

13. A product according to claim 1 having a particle size D3.2 of 1–7 micron and a Stevens value at 10° C. of 70–150 g.

14. A product according to claim 1 having a dry matter content of 26–35%.

* * * * *